C. J. WEBORG.
SAWING MACHINE.
APPLICATION FILED OCT. 12, 1918.

1,298,270.

Patented Mar. 25, 1919.
2 SHEETS—SHEET 2.

WITNESSES
H. Woodard
L. M. Hawkins

INVENTOR
C. J. WEBORG
BY

ATTORNEYS

UNITED STATES PATENT OFFICE.

CHARLES J. WEBORG, OF PENDER, NEBRASKA.

SAWING-MACHINE.

1,298,270.   Specification of Letters Patent.   Patented Mar. 25, 1919.

Application filed October 12, 1918. Serial No. 257,867.

*To all whom it may concern:*

Be it known that I, CHARLES J. WEBORG, a citizen of the United States, and a resident of Pender, in the county of Thurston and State of Nebraska, have invented certain new and useful Improvements in Sawing-Machines, of which the following is a specification.

My invention is an improvement in sawing machines, and has for its object to provide a light durable machine of the character specified, capable of use in felling or cutting up trees, wherein the arrangement is such that the tree may be cut close to the ground, to permit the use of agricultural implements over the ground without the necessity for the removal of the stump.

Figure 1:
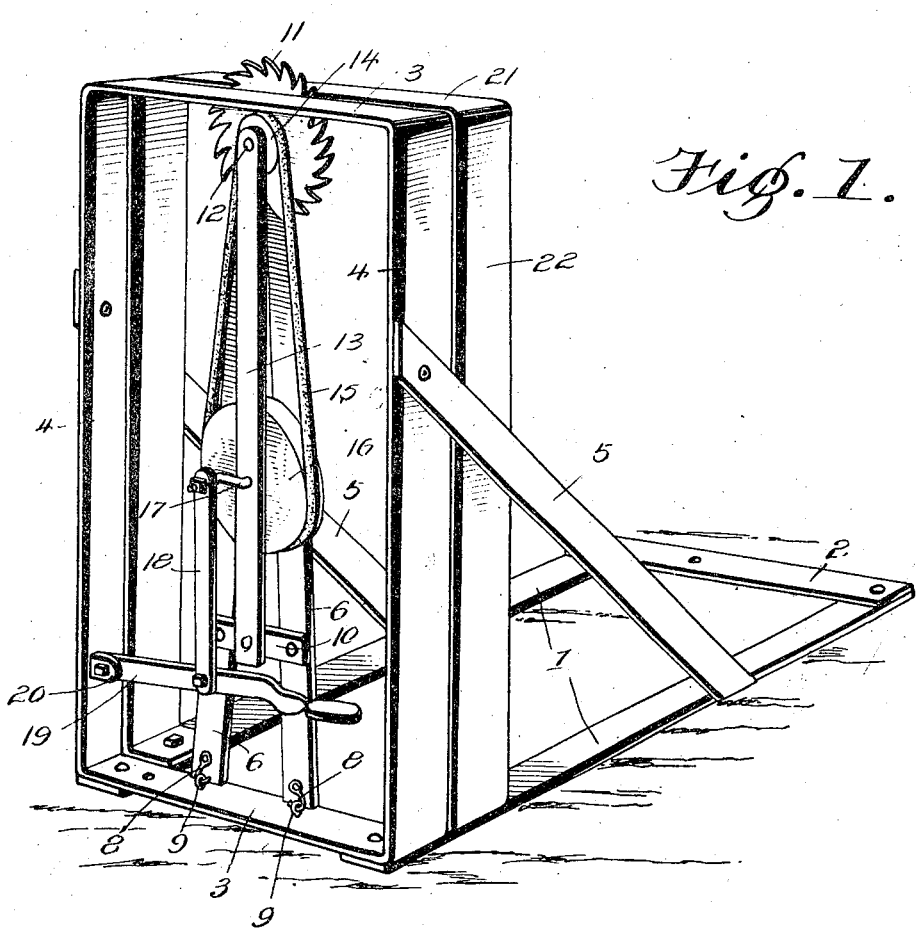
Figure 1 is a perspective view of the machine.
Figure 4:
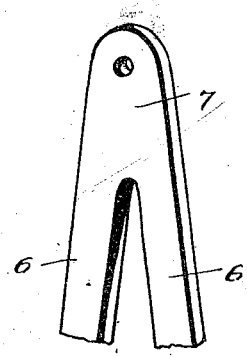
Fig. 4 is a partial perspective view of one end of the saw supporting standard.

In the embodiment of the invention shown in Fig. 1 the device is arranged for use in edging or ripping. The improvement comprises a supporting frame consisting of a substantially rectangular base, composed of spaced parallel side plates 1 and a connecting cross plate 2 at one end of the said plate 1. The opposite ends of the plates 1 are connected by the end member 3 of a substantially rectangular frame consisting of the said end member 3 and side members 4.

This frame 3—4 may be of integral construction, as, for instance, of metal, and the frame 1—2 may also be of metal. The side members 4 of the frame 3—4 are braced against the side members 1 of the frame 1—2 by inclined braces 5, and it will be noted that the members 1 and 2 of the frame 1—2 have their wide dimensions in the plane of the frame, while the end and side members of the frame 3—4 have their wide dimensions perpendicular to the plane of the frame.

A saw supporting standard is provided, the said standard being substantially triangular in outline, consisting of two members 6 integral at one end, as indicated at 7, and diverging toward the other end, and the diverging ends of the members have hooks 8 pivotally connected therewith. These hooks are adapted to engage eyes 9 on the inner face of the end member 3 to which the frame 1—2 is connected, and the members 6 of the frame are connected near their free ends by a cross bar 10. Thus a rigid supporting frame is provided for the saw 11, which is secured to a mandrel 12 journaled in the connection 7 of the members 6 of the standard and in a bar 13 which is connected at one end with the mandrel of the saw and at the other with the cross bar 10.

A pulley 14 is secured to the mandrel, and any suitable operating mechanism may be connected with the pulley 14, as, for instance, the mechanism shown. This mechanism comprises a belt 15, which connects the pulley 14 with a drive pulley 16 secured to a crank shaft 17 journaled in the supporting frame or standard for the saw, between the members 6 and the bar 13.

A link 18 connects the crank of the crank shaft with a treadle 19 which is pivoted to a lug 20 on the inner face of one of the side members 4 of the frame 3—4. Referring to Fig. 1, it will be noted that the teeth of the saw extend just far enough beyond the end member 3 of the frame 3—4 remote from the frame 1—2 to permit the said end member 3 to serve as a guide for the movement of the planks in ripping.

In operations of this character a second U-shaped frame, consisting of a body 21 and arms 22, is connected with the frame 1—2, the arms 22 of the frame 21—22 being connected to the side members 1 of the frame 1—2. This frame 21—22 corresponds in size to the frame 3—4 so that the body 21 of the frame is in the same plane with the end member 3 of the frame 3—4 adjacent to the saw. The body 21 of this frame 21—22 has its edge spaced apart from the adjacent edge of the adjacent end plate 3 of the frame 3—4.

In the operation of this arrangement the boards to be ripped are moved past the saw resting upon the body 21 of the auxiliary frame 21—22 and upon the adjacent end member 3 of the frame 3—4.

Figure 2:
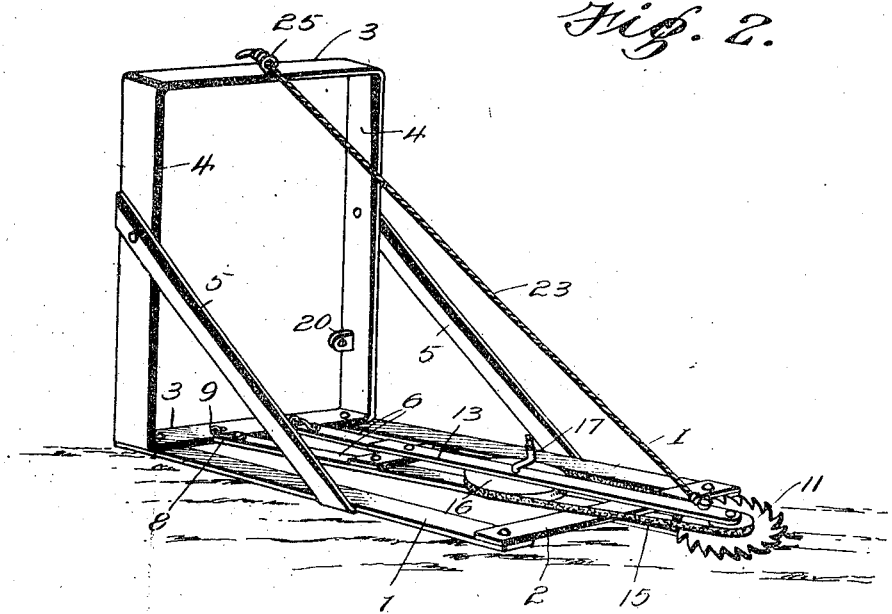
Figs. 2 and 3 are similar views, with the parts in different positions.

In Fig. 2 the device is shown arranged for felling trees. With this arrangement the lever 19 is detached from the lug 20. The hooks are disengaged from the eyes 9 and the saw supporting standard is laid upon the frame 1—2, as shown in Fig. 2. The hooks 8 are now again engaged with the eyes 9, with the ends of the members 6 of the standard abutting the edge of the frame end 3.

A flexible member 23, as, for instance, a rope or cable, is connected with a headed pin 24 on the bar 13, and with an eye 25 on that end member of the frame 3—4 remote from the frame 1. This flexible member 23 has a knot at the end adjacent to the eye 25 to permit its slipping through the eye, and by means of the flexible member the standard may be held in any position of inclination desired, if it is not desired that it rest flat upon the frame 1—2. The side members 1 of the frame 1—2 are of such length that when the saw supporting standard is in the position of Fig. 2 the saw will be extended far enough beyond the frame to permit it to saw through a tree.

Figure 3:
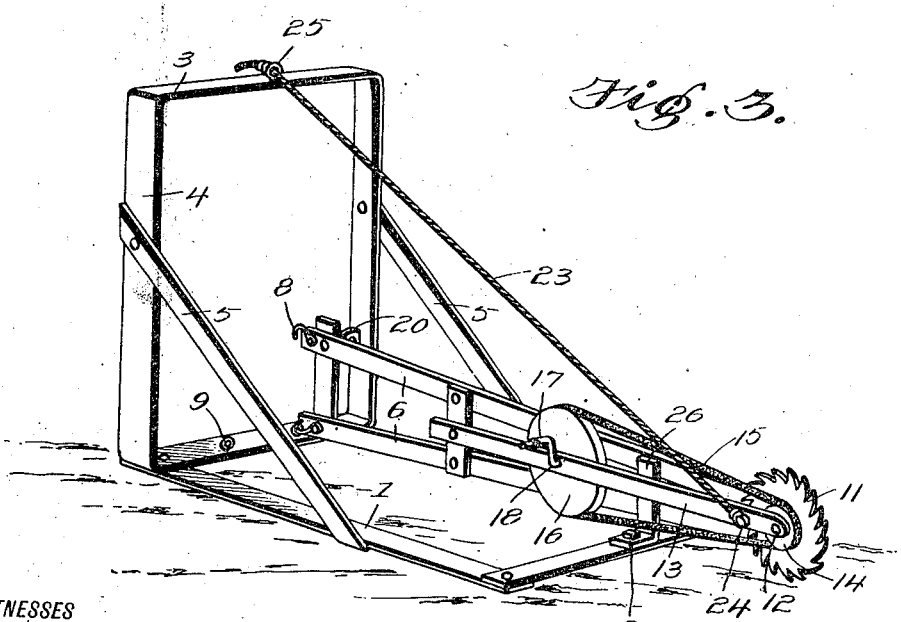

In Fig. 3 the device is shown arranged to cut the felled tree into log lengths or into lengths of any size desired. With this arrangement one of the hooks 8 is disengaged from its eye, and the saw supporting standard is turned with its plane vertical. An angle plate 26 has one portion detachably connected to the outermost end member of the frame 1—2, as indicated at 27, and the other portion of the angle plate extends upwardly between the bar 13 and the member 6 of the saw supporting frame.

In practice, the windlass may be attached to the frame 3—4, having a cable and hook for feeding the saw when felling trees.

I claim:

1. A sawing machine comprising a substantially rectangular main frame, an auxiliary frame rigid with one end of the main frame and extending at right angles thereto, a saw supporting standard detachably connected with the main frame and the auxiliary frame at their connection and adapted to lie in the plane of the main frame or in the plane of the auxiliary frame, said standard carrying a saw extending beyond the ends of the frames when the standard is in place, said auxiliary and main frames and the saw supporting standard having interengaging means for holding the standard with the plane of the saw approximately parallel to the plane of either of the frames or at right angles to the plane of the main frame, said standard and frames being of such relative length that the teeth of the saw will extend just beyond the outer end of either of the frames, and a support for the work adapted to be connected with the main frame on the opposite side of the saw from the auxiliary frame.

2. A sawing machine comprising a substantially rectangular main frame, an auxiliary frame rigid with one end of the main frame and extending at right angles thereto, a saw supporting standard detachably connected with the main frame and the auxiliary frame at their connection and adapted to lie in the plane of the main frame or in the plane of the auxiliary frame, said standard carrying a saw extending beyond the ends of the frames when the standard is in place, said auxiliary and main frames and the saw supporting standard having interengaging means for holding the standard with the plane of the saw approximately parallel to the plane of either of the frames or at right angles to the plane of the main frame.

3. A sawing machine comprising a substantially rectangular main frame, an auxiliary frame rigid with one end of the main frame and extending at right angles thereto, a saw supporting standard detachably connected with the main frame and the auxiliary frame at their connection and adapted to lie in the plane of the main frame or in the plane of the auxiliary frame, said standard carrying a saw extending beyond the ends of the frames when the standard is in place.

CHARLES J. WEBORG.